No. 666,151. Patented Jan. 15, 1901.
H. D. McKINNEY.
CHECK HOOK.
(Application filed Feb. 23, 1900.)
(No Model.)
*Fig. 1*
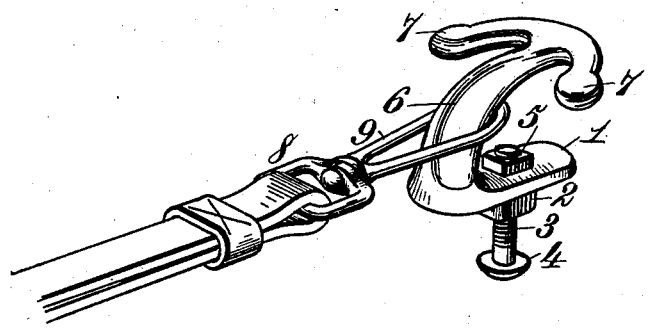
*Fig. 5*
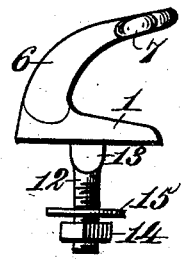
*Fig. 2*
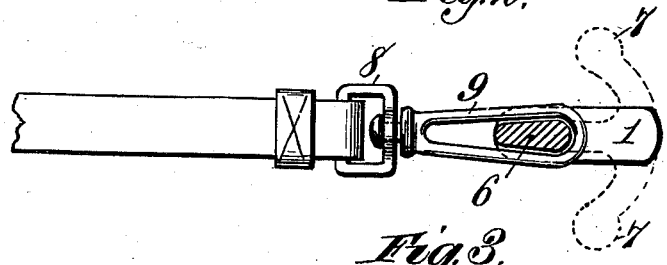
*Fig. 3.*
*Fig. 4.*
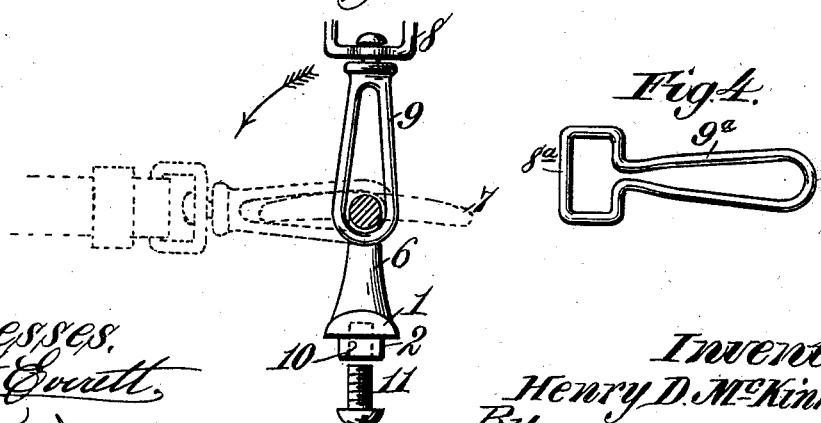
Witnesses,
Robert Everett,
H. B. Keefer
Inventor
Henry D. McKinney,
By James L. Norris
Att'y.

UNITED STATES PATENT OFFICE.

HENRY D. McKINNEY, OF JANESVILLE, WISCONSIN.

CHECK-HOOK.

SPECIFICATION forming part of Letters Patent No. 666,151, dated January 15, 1901.

Application filed February 23, 1900. Serial No. 6,224. (No model.)

*To all whom it may concern:*

Be it known that I, HENRY D. MCKINNEY, a citizen of the United States, residing at Janesville, in the county of Rock and State of Wisconsin, have invented new and useful Improvements in Checkrein-Holders, of which the following is a specification.

This invention relates to checkrein-hooks; and it has for its object to provide an improved hook of the character referred to so constructed that the checkrein or bearing strap cannot be accidentally detached from the hook.

It also has for its object to so construct the hook that when the animal strains upon the checkrein the strain will be exerted upon the strongest part of the hook.

To these ends my invention consists in the features and in the construction, combination, and arrangement of parts hereinafter described, and particularly pointed out in the claim following the description, reference being had to the accompanying drawings, forming a part of this specification, wherein—

Figure 1 is a perspective view of my improved checkrein-hook, showing the checkrein or bearing strap connected thereto. Fig. 2 is a top plan view, the checkrein-hook being shown in section. Fig. 3 is a vertical sectional view illustrating the manner of attaching and detaching the checkrein-loop and also illustrating slightly-different means from that shown in Fig. 1 for securing the hook to the gig-saddle. Fig. 4 is a detail view of a slightly-different construction of the checkrein-loop from that shown in the preceding figures, and Fig. 5 is a side elevation showing modified means for attaching the hook to the saddle-tree.

Referring to the drawings, the numeral 1 indicates the base of my improved checkrein-hook, consisting of a flat metallic plate or casting having formed on its under side an integral nut or angular boss 2, that is adapted to fit in a correspondingly-shaped recess formed in the gig-saddle and prevent the checkrein-hook from turning thereon. The base is secured to the gig-saddle in the example shown in Fig. 1 of the drawings by a bolt 3, which passes up through the nut or boss 2 and through the base, said bolt being provided at its lower end with a flat rounded head 4, that is adapted to lie flush against the under side of the gig-saddle tree and at its upper end is threaded and has screwed thereover a nut 5, by means of which the base is drawn tightly to its seat on the gig-saddle. Formed on the forward end of the base 1 is an upwardly-projecting shank 6, which curves upward and rearward, as shown, and terminates in two forwardly-projecting curved arms 7. As shown, the shank 6 tapers from its lower toward its upper end and is oblong or flattened in cross-section, the major axis of the cross-section of the shank lying in the same vertical plane with the longitudinal axis of the base 1, as most clearly shown in Fig. 2. The shank tapers from its base upward and gradually merges into a substantially circular or cylindrical shape in cross-section, as most clearly shown in cross-section in Fig. 3 of the drawings.

For the sake of strength I prefer to make the shank of greater width at its rear than at its forward side.

In Figs. 2 and 3 of the drawings the checkrein or bearing-strap is shown as attached to a buckle-ring 8, and in the end of said buckle-ring is swiveled an elongated loop 9.

To fasten the checkrein, it is only necessary to slip the loop 9 over one of the curved arms 7, next draw it over the other arm, and then by turning the loop up to a vertical position it will slip down into position over the shank 6. When in place, the sides of the loop embrace the flattened or elongated sides of the shank, and the loop is prevented thereby from turning on the shank. The loop cannot be disconnected or removed from the hook without first turning it about the shank 6, for in order to remove the loop it must first be raised to a vertical position, as shown in Fig. 3, until it reaches a portion of the shank sufficiently reduced to permit the turning of the loop, next turned horizontally to one side, as shown in dotted lines in said figure, to bring it into alinement with one of the arms 7, and then given a half-turn horizontally to slip it from off said arms. Hence it will be seen that the loop cannot accidentally be disconnected from the hook—as, for example, by the horse throwing his head or from other causes.

By swiveling the loop 9 on the buckle-ring the operation of connecting the loop to and disconnecting it from the hook is greatly facilitated, as it permits the loop to be turned into the various different positions without twisting the checkrein or bearing-strap and without unduly drawing back the horse's head. The swiveled loop also enables the checkrein to be conveniently used either as an overdraw or side check. Instead, however, of swiveling the loop to the buckle-ring as above described the two may be made in one single integral piece, as shown in Fig. 4, the numeral $8^a$ in said figure indicating the buckle-ring and $9^a$ the loop, the two being bent up or otherwise suitably formed from a single piece of wire or other suitable material.

Instead of securing the hook to the gig-saddle as described and as shown in Fig. 1 the nut 5 may be dispensed with and the said boss and base may themselves constitute a nut by forming a threaded socket 10 therein, as shown in Fig. 3, and passing a screw 11 up through the saddletree from the under side and screwing it into the socket. In either of the described ways of securing the hook to the gig-saddle the nut usually placed under the saddletree for screwing over the end of the bolt employed for securing the hook to the saddle is dispensed with. Such a nut frequently galls and bruises the back of the animal, and by securing the saddle in the manner above described such objectionable result is entirely avoided.

As has been before described, the shank 6 of the hook tapers from its base upward and said shank is formed at a rearwardly-inclined angle to the base. Hence when the horse pulls upon the checkrein or forcibly throws his head forward or downward the checkrein buckle-ring will be drawn down the inclined rear edge of the hook and cause said buckle-ring to slip down about the lower or thicker and larger end of the shank, which is its strongest portion and most capable of standing excessive strain.

Constructed in the manner shown and described the improved checkrein-hook is not only exceedingly strong and durable and effectually prevents the checkrein-loop from becoming detached from the hook, but it is also very neat, ornamental, and attractive in appearance and can be manufactured at a small cost.

Instead of securing the hook to the gig-saddle as shown in Figs. 1 and 3 of the drawings it may be secured in place thereon as shown in Fig. 5. Referring to said figure, the base 1 of the hook has formed integrally therewith a threaded shank 12, which projects vertically downward from the under side of said base and at its upper end is flattened and widened, as at 13. The threaded shank 12 passes through a perforation formed in the gig-saddle, and the flattened portion 13 fits a correspondingly-shaped recess in the upper side of the saddletree and prevents the shank from turning. Over the lower end of the shank is screwed a nut 14, and between said nut and the bottom of the gig-saddle is placed a washer 15. By screwing the nut up tightly to place the shank and its hook are firmly fastened in place on the gig-saddle.

Having described my invention, what I claim is—

A checkrein-hook comprising a base, and a shank projecting upwardly and rearwardly and gradually tapering from the base and terminating at its upper end in two laterally-projecting arms, said shank being oblong in cross-section or flattened on its opposite sides and gradually merging into a substantially circular shape in cross-section at its upper end, substantially as described and for the purpose specified.

In testimony whereof I have hereunto set my hand in presence of two subscribing witnesses.

HENRY D. McKINNEY.

Witnesses:
H. H. McKINNEY,
WM. W. MENZIES.